(12) United States Patent
Diaz Bueno et al.

(10) Patent No.: US 7,694,623 B2
(45) Date of Patent: Apr. 13, 2010

(54) TANDEM PNEUMATIC BRAKE BOOSTER

(75) Inventors: Ignacio Diaz Bueno, La Celle Saint Cloud (FR); Christian Ast, Rueil Malmaison (FR); Christian Caquet, Courtry (FR); Jean-Pierre Michon, Saint Pathus (FR)

(73) Assignee: Robert Bosch GmbH (DE)

( * ) Notice: Subject to any disclaimer, the term of this patent is extended or adjusted under 35 U.S.C. 154(b) by 237 days.

(21) Appl. No.: 11/931,604

(22) Filed: Oct. 31, 2007

(65) Prior Publication Data
US 2008/0105116 A1   May 8, 2008

(30) Foreign Application Priority Data
Nov. 2, 2006   (FR) .................................. 06 09691

(51) Int. Cl.
F15B 9/10   (2006.01)
F01B 19/00   (2006.01)
(52) U.S. Cl. .......................................... 91/376 R; 92/49
(58) Field of Classification Search ............... 91/376 R; 92/49
See application file for complete search history.

(56) References Cited

U.S. PATENT DOCUMENTS

| | | | |
|---|---|---|---|
| 4,834,691 A | | 5/1989 | Schultze et al. |
| 5,062,348 A | | 11/1991 | Gotoh et al. |
| 5,083,496 A | * | 1/1992 | Suzuki et al. ............. 91/376 R |
| 5,115,719 A | * | 5/1992 | Endo ........................ 91/376 R |
| 6,053,090 A | * | 4/2000 | Drott et al. ............... 91/376 R |

FOREIGN PATENT DOCUMENTS

FR   2614383 A1   10/1988

OTHER PUBLICATIONS

FR06 09691 Search Report and Opinion.

* cited by examiner

Primary Examiner—Michael Leslie
(74) Attorney, Agent, or Firm—Michael Best & Friedrich LLP

(57) ABSTRACT

The invention relates to a tandem pneumatic brake booster (1) for a vehicle. The objective is to prevent a blocking of a booster thrust rod (4) in the maximum travel position. The blocking appears following a sealed adhesion of a first plate skirt (12) on a seal (22) of the tandem booster. This seal blocks a vacuum in a first front chamber (5). To prevent this blocking, provision is made to crenelate a first lip (23) pressed against the pneumatic piston (3) of a seal. Merlons prevent a sealed adhesion of the plate skirt (12) over the whole seal (22). This absence of adhesion creates a leakage of air to the first front chamber (5) and allows a return to a rest position.

15 Claims, 3 Drawing Sheets

TANDEM PNEUMATIC BRAKE BOOSTER

BACKGROUND AND SUMMARY OF THE INVENTION

The present invention relates to a tandem pneumatic brake booster for a vehicle. The object of the invention is to allow a return of a brake pedal to the rest position after a maximum stroke of a thrust rod of this booster. The invention prevents the retention of a vacuum in a first front chamber of the booster. The invention relates more particularly to the field of automobiles but may also apply in other fields.

A tandem pneumatic brake booster for a vehicle is situated between a brake pedal of the vehicle and a master cylinder. The booster makes it possible to convert a pressure of a driver's foot on a brake pedal into a pneumatically amplified pressure. This pneumatically amplified pressure is designed to brake the vehicle. Accordingly, the booster makes it possible to markedly lessen a force supplied by the driver when he presses on the brake pedal.

Such a booster comprises, in a booster shell, a front chamber and a first rear chamber mounted in series with a second front chamber and a second rear chamber. The first front chamber and the second front chamber are respectively closer to the master brake cylinder than the first rear chamber and the second rear chamber. The second front chamber and the second rear chamber are closer to the master cylinder than the first front chamber and the first rear chamber.

Each of the chambers comprises a variable volume. The first and the second front chamber are respectively separated in a sealed manner from the first and second rear chamber by a first and second plate skirt. Each plate skirt is formed by a sealed and flexible membrane associated with a rigid plate. The membrane of the plate skirt rests on the rigid plate. The rigid plate is pressing on a pneumatic piston forming the thrust rod which actuates the master cylinder. The membrane is attached to the pneumatic piston on one side, and to a wall of the booster shell opposite the pneumatic piston on another side.

The first front chamber is separated in a sealed manner from the second rear chamber by a fixed rigid partition in the booster. This fixed partition is fixedly attached to a wall of the shell opposite the pneumatic piston.

The first and the second front chambers communicate with one another via one or more communication ducts. Such communication ducts open into a central hollow portion of the pneumatic piston. The number of ducts present in the pneumatic piston must be sufficient to allow a good communication between the first front chamber and the hollow central portion of the pneumatic piston, without weakening the structure of the pneumatic piston. Such communication ducts between the hollow central portion of the piston and the first front chamber have one end opening into the first front chamber, at a location close to a bearing surface of the first plate skirt. They have one end opening into the hollow central portion of the pneumatic piston. The hollow central portion of the pneumatic piston opposite the master cylinder is open and communicates with the second front chamber.

One of the front chambers, usually the second front chamber, is connected to a vacuum source. This vacuum source may, for example, be a vacuum pump fixed to the shell of the booster. This vacuum pump then communicates with the front chambers. The vacuum pump maintains a vacuum in the two front chambers thanks to the communication ducts between them.

The booster furthermore contains a communication valve. This valve blocks communication between the front chambers and the rear chambers and communication between the rear chambers and the atmosphere depending on the position of the pneumatic piston in the booster.

In the rest position, that is to say when the pneumatic piston is not moved forward by the booster, the front chambers communicate freely with the rear chambers. The chambers are then all isolated from the atmosphere. The vacuum that is imposed by the vacuum pump is then established in the front chambers and in the rear chambers.

At the time of braking, during a first phase of movement of the pneumatic piston in the booster, communication between the front and rear chambers is cut off by a communication valve. The front chambers are then isolated from the rear chambers.

During a second phase of piston movement, the rear chambers are placed in communication with the atmosphere. When the rear chambers are in communication with the atmosphere, the front chambers are still isolated from the rear chambers and still contain a vacuum.

The communication of the rear chambers with the atmosphere causes the pressure to rise in the rear chambers to the same level as the atmospheric pressure. There is then a pressure difference between the front chambers and the rear chambers. This pressure difference moves forward the plate skirts separating the front chambers from the rear chambers and moves the pneumatic piston on which the plate skirts rest.

A return spring is usually placed inside such a booster. The function of this return spring is to help the pneumatic piston to return to the rest position after braking. Such a spring presses on the wall of the booster close to the master cylinder on one side and on the pneumatic piston on the other side.

Once the brake pedal is no longer pressed, the return spring pushes the pneumatic piston back to its rest position. The rear chambers are then no longer in communication with the atmosphere. Communication between the rear chambers and the front chambers is then reestablished. The vacuum present in the front chambers then extends into the rear chambers.

In order to seal the rigid partition separating the first front chamber from the second rear chamber, without hampering the movement of the pneumatic piston in the booster, a seal is situated on an inner snout of the fixed rigid partition. This seal completely surrounds the pneumatic piston in a sealed manner. During its movement, the pneumatic piston slides in a sealed manner inside this seal. The sealing of the seal prevents the vacuum in the front chambers from disappearing when the pressure in the rear chambers rises.

Such a seal comprises a first lip. This first lip extends parallel to the axis of movement of the pneumatic piston. This first lip extends in a direction opposite to the direction of travel of the pneumatic piston during braking. This first lip is pressed against the wall of the pneumatic piston in a sealed manner. This first lip is housed in the first front chamber. This first lip provides the seal between the first front chamber and the second rear chamber.

During braking, a master cylinder activated by a thrust rod must always carry out a maximum stroke of movement that is less than the stroke of movement of the pneumatic piston of the booster. In this manner, the thrust rod comes to a stop in the master cylinder before the plate skirt of the first chamber comes into contact with the fixed rigid partition. Accordingly, the maximum stroke in the master cylinder must be less than the maximum stroke of a thrust rod. When the master cylinder and the pneumatic piston of the booster have very similar stroke lengths, it may be, particularly for reasons of manufacturing tolerances or of deformation clearances of the parts of the booster due to the pressure, that the first plate skirt comes into contact against the seal fixed to the fixed rigid partition.

This contact between the first plate skirt and the seal occurs on the edge of the first lip pressed against the wall of the pneumatic piston. If necessary, this contact occurs on the wall of a second lip facing the first plate skirt. This contact causes the first plate skirt to adhere to the seal. When such an adhesion occurs, there is no longer communication between the two front chambers. Specifically, the seal, adhering to the plate skirt, inserts itself in a sealed manner between the first front chamber and the communication duct between the front chambers that are present on the pneumatic piston.

The vacuum in the first front chamber is then maintained inside the first front chamber. Then a suction effect is created which prevents the first plate skirt from separating from the seal when the pressure on the pneumatic piston is relaxed. The first plate skirt being fixed to the pneumatic piston, the return to the rest position of the pneumatic piston inside the booster cannot take place. The result of this is that the brake pedal no longer returns to its position. The vehicle remains immobile or, at best, releases slowly.

To solve this problem, a more powerful return spring could be used. However, such a spring, having sufficient power to release the first lip from the seal of the plate skirt despite the vacuum, would reduce the effectiveness of the thrust of the plate skirts due to the pressure difference between the chambers. The plate skirt would then no longer move the pneumatic piston in a satisfactory manner to allow the booster to correctly fulfill its role.

Another solution that can be imagined has consisted in adding protrusions to the wall of the second lip of the seal fixed to the fixed partition opposite the first plate skirt. These protrusions were to make it possible to create a circulation space to release the vacuum from the first front chamber. This space was thought to prevent the vacuum from persisting in the first front chamber. However, such a solution is revealed by experience to be ineffective. Specifically, the deformation of the seal and the first plate skirt by the pressure does not prevent the vacuum from being trapped in the first front chamber. This solution does not provide sufficient communication between the front chambers.

To solve this problem, the invention makes provision to place protrusions on the edge of the first lip of the seal opposite the first plate skirt, preferably while associating these protrusions on these edges with protrusions situated on the second lip of the seal. The first lip of the seal then has the shape of a crenelated lip.

When the first plate skirt moves towards the fixed partition separating the first front chamber from the second rear chamber, the first plate skirt presses on the tops of the merlons of the first lip of the seal.

A communication leakage is then created still in the space between the merlons of the first lip of the seal. The plate skirt cannot adhere in a sealed manner to the seal in this space. In the same manner, this communication leakage may be extended between protrusions of the second lip of the seal. The vacuum may then be released by these communication leakages and no longer remains blocked in the first front chamber. The suction effect that this vacuum created no longer exists, and the first plate skirt and the pneumatic piston can then return to the rest position.

The subject of the invention is therefore a tandem pneumatic brake booster for a vehicle comprising a shell, a pneumatic piston sliding in the shell, two pairs of chambers, each pair comprising a front chamber and a rear chamber, the front chamber being situated closer to a brake master cylinder than the rear chamber, a fixed partition in the booster, separating a first front chamber from a second rear chamber, a first plate skirt, separating the first front chamber from the first rear chamber, and a second plate skirt, separating the second front chamber from the second rear chamber, these plate skirts being movable, sealed and moving the pneumatic piston, a seal fixed to the fixed partition, the pneumatic piston sliding inside this seal in a sealed manner, this seal comprising a first lip pressed on the pneumatic piston in a sealed manner, and extending parallel to the axis of movement of the pneumatic piston, characterized in that the first lip is crenelated.

BRIEF DESCRIPTION OF THE DRAWINGS

The invention will be better understood on reading the following description and on examining the figures accompanying it. The latter are presented only as an indication and are in no way limiting with regard to the invention. The figures show.

DETAILED DESCRIPTION

Figure 1:
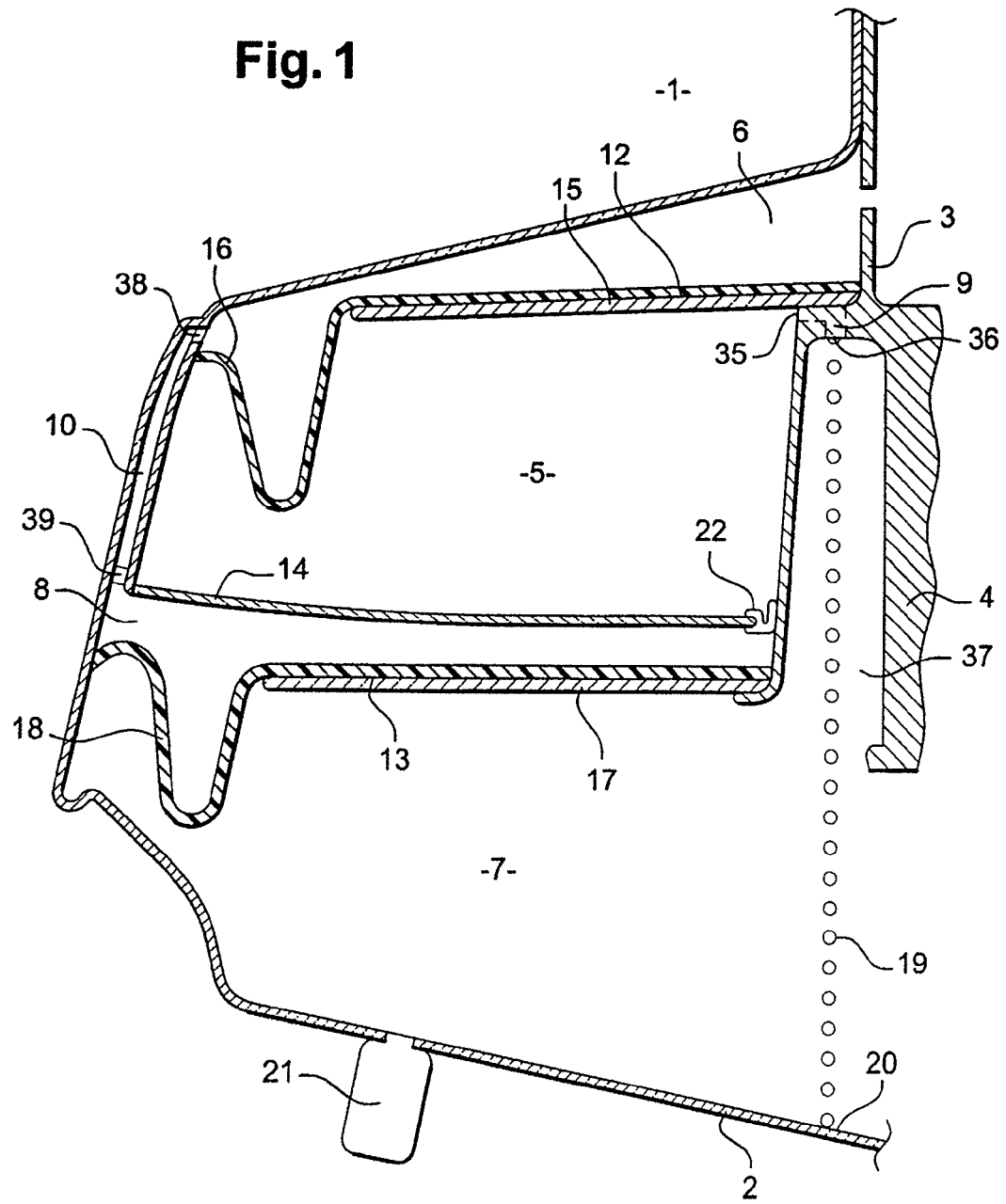
FIG. 1: A cross section of a portion of a tandem booster at rest.

FIG. 1 represents a cross section of a portion of a tandem booster 1 at rest. Preferably the booster 1 and the majority of the parts that it comprises have a circular shape. A booster 1 comprises an outer shell 2. The booster 1 comprises a pneumatic piston 3. This pneumatic piston 3 comprises a thrust rod 4 provided to create pressure on a master cylinder.

The booster 1 comprises a first front chamber 5 and a first rear chamber 6. The booster also comprises a second front chamber 7 and a second rear chamber 8.

The first front chamber 5 is in communication with the second front chamber 7 via a communication duct 9 made in the pneumatic piston 3. This communication duct 9 opens at one end 35 in the first front chamber 5 and at one end 36 in a hollow central portion 37 of the piston 3. The hollow central portion 37 is open to the second front chamber 7.

The first rear chamber 6 is constantly in communication with the second rear chamber 8 via a communication duct 10. This communication duct 10 is made, for example, in the wall of the shell 2. This duct 10 opens, while traversing the shell 2 via a passage 38, into the first rear chamber 6. This duct 10 opens, while traversing the shell 2 via a passage 39, into the second rear chamber 8.

The booster 1 furthermore comprises a first plate skirt 12 and a second plate skirt 13 and a fixed partition 14 in the booster 1.

The first plate skirt 12 comprises a rigid plate 15 and a flexible skirt 16. The rigid plate 15 and the flexible skirt 16 are fixedly attached to the piston 3. The flexible skirt 16 is also attached to a wall of the shell 2 opposite the piston 3. The first plate skirt 12 sealingly separates the first front chamber 5 from the first rear chamber 6.

The second plate skirt 13 comprises a rigid plate 17 and a flexible skirt 18. The rigid plate 17 and the flexible skirt 18 are fixedly attached to the pneumatic piston 3. The flexible skirt 18 is also attached to a wall of the shell 2 opposite the piston 3. The second plate skirt 13 sealingly separates the second front chamber 7 from the second rear chamber 8.

These plate skirts 12 and 13 are movable and sealed in the booster 1. The plate skirts 12 and 13 move the pneumatic piston 3 during their movements, particularly by pressing on shoulders of the piston 3.

The fixed partition 14 is fixedly attached to the shell 2 of the booster 1. This fixed partition 14 sealingly separates the first front chamber 5 from the second rear chamber 8. The fixed partition 14 is rigid. The pneumatic piston 3 slides inside a space made in the fixed partition 14.

The first front chamber 5 is delimited by the first plate skirt 12, the piston 3, the partition 14 and the shell 2 of the booster 1. The second front chamber 7 is delimited by the piston 3, the shell 2 of the booster 1 and the second plate skirt 13. The first rear chamber is delimited by the first plate skirt 12, the piston 3 and the shell 2 of the booster 1. The second rear chamber is delimited by the piston 3, the partition 14, the shell 2 and the second plate skirt 13. All the chambers that make up the booster 1 have variable volume.

The first front chamber 5 and the second front chamber 7 are respectively closer to the master cylinder than the first rear chamber 6 and the second rear chamber 8. Furthermore the second front chamber 7 and the second rear chamber 8 are respectively closer to the master cylinder than the first front chamber 5 and the first rear chamber 6.

At rest, the first front chamber 5 and the second front chamber 7 are in communication with the first rear chamber 6 and the second rear chamber 8. This communication is provided by the presence of a communication valve (not shown here) situated in the pneumatic piston 3. This communication valve blocks or authorizes communication between the front chambers and the rear chambers during a movement of the piston 3 in the booster 1. This communication valve also blocks or authorizes communication between the rear chambers and the atmosphere during a movement of the piston 3 in the booster 1.

A return spring 19 is mounted in the booster 1. This return spring 19 presses at one of its ends against the piston 3, and against a wall 20 of the shell 2 delimiting the second front chamber 7 of the booster 1 at its other end. The function of this return spring 19 is to return the piston 3 to the rest position after a forward travel of the piston 3.

A vacuum pump 21 is connected to the second front chamber 7. This vacuum pump 21 produces a vacuum in the second front chamber 7. This vacuum extends into the first front chamber 5 via the communication duct 9 between the first front chamber 5 and the second front chamber 7. This vacuum pump 21 may comprise a connection to a fuel supply circuit of the vehicle engine.

At rest, communication between the front chambers and the rear chambers, provided by the communication valve, causes the vacuum created by the vacuum pump 21 to extend to the rear chambers.

A seal 22 is fixed to the fixed partition 14. This seal 22 seals the fixed partition 14 between the first front chamber 5 and the second rear chamber 8 without hampering the movement of the piston 3 in the booster 1. This seal 22 surrounds the piston 3. The piston 3 slides in a sealed manner inside this seal 22.

Figure 2:
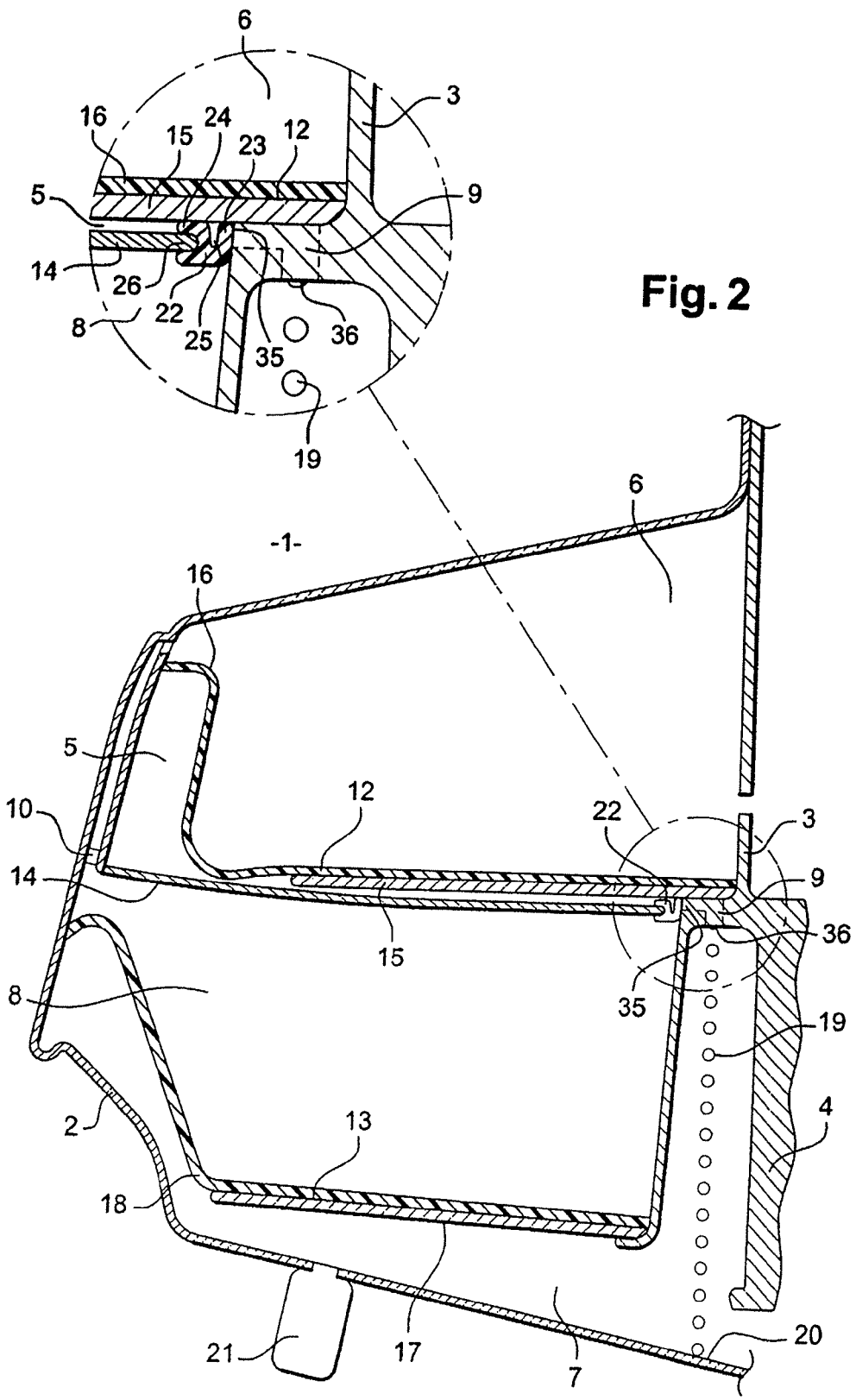
FIG. 2: A cross section of a portion of a tandem booster furnished with a known seal after a maximum stroke of the pneumatic piston.

FIG. 2 represents a cross section of a portion of a booster 1 furnished with a known seal in a situation corresponding to a maximum stroke of the piston 3. During a maximum stroke, the body of the piston 3 will block communication between the front chambers. This blocking of communication between the front chambers arises from the fact that the first plate skirt 12 moves closer to the fixed partition 14. In the event of a maximum stroke of the piston 3 and if the master cylinder and the pneumatic piston 3 have a similar maximum stroke, the first plate skirt 12 comes to adhere against the seal 22.

This seal 22 comprises a first lip 23 pressed to the piston 3 in a sealed manner. This sealed pressure provides the seal between the first front chamber 5 and the second rear chamber 8.

This first lip 23 extends parallel to the axis of movement of the piston 3 during its forward movement in the booster. This first lip 23 extends in a direction opposite to the movement of the piston 3 during braking. This first lip 23 extends in the first front chamber 5.

Usually, the seal 22 comprises a second lip 24 opposite the first plate skirt 12. This second lip 24 extends on a plane perpendicular to the axis of movement of the piston 3 in the first front chamber. A groove 25 may be situated on the seal 22 between the first lip 23 and the second lip 24. A second groove 26 may be provided for fixing the seal 22 to the fixed partition 14; the fixed partition 14 nests in this second groove 26.

During contact between the first plate skirt 12 and the seal 22, the rigid plate 15 presses on the first lip 23. This pressure becomes sealed by the pressure exerted by the rigid plate 15 on the first lip 23 of the seal 22. The vacuum inside the first front chamber 5 is therefore isolated and blocked inside this first front chamber 5. The blocking occurs all the more because the first lip 23 is situated, in correspondence with the maximum of the stroke, just in line with the orifices 35 of the duct 9. This blocking causes a suction effect which blocks the first plate skirt 12 in its position, that is to say adhering against the seal 22, when the pressure on the brake pedal is released. The pneumatic piston 3 being fixedly attached to the plate skirt 12, the piston 3 cannot resume a rest position when a driver relaxes his pressure on the brake pedal.

Figure 3:
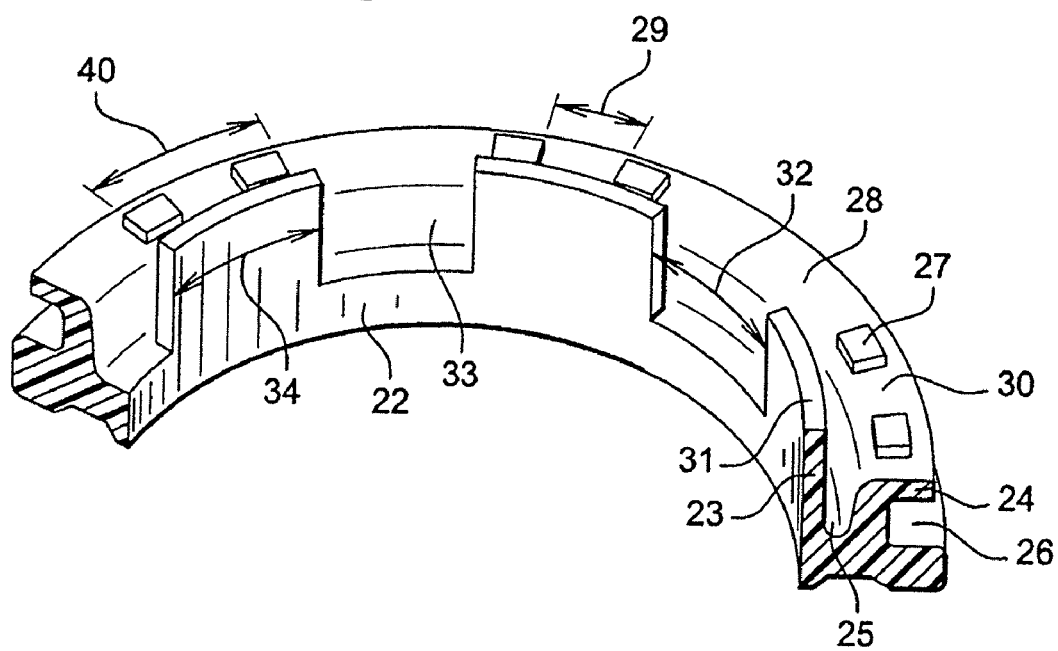
FIG. 3: A view in schematic perspective of a portion of a seal fixed to the fixed partition in the tandem booster according to the invention.

FIG. 3 represents a view in schematic perspective of an example of a portion of a seal 22 for a tandem booster 1 according to the invention. According to the invention, the first lip 23 of such a seal 22 is crenelated with merlons such as 31.

When the first plate 12 adheres to the seal 22, the first plate skirt 12 presses on the first lip 23 of the seal 22.

According to the invention, the first plate skirt 12 presses on the tops of the merlons 31 of the first lip 23. These merlons 31 prevent the first plate skirt 12 from adhering in a sealed manner to the seal 22 in a space 32 separating two merlons 31 of the first lip 23. A communication leakage 33 then exists between the first front chamber 5 and the communication duct 9 between the two front chambers 5 and 7. This communication leakage 33 passes between the space 32 separating two merlons 31 and the first plate skirt 12.

The vacuum contained in the first front chamber 5 is then no longer blocked by the seal 22. This vacuum can be released from the first front chamber 5 via the communication leakage 33. The release of this vacuum allows the plate skirts 12 and 13, and the piston 3 to be no longer blocked in the maximum stroke position and to return to the rest position normally.

In order to provide an effective communication between the first front chamber 5 and the communication duct 9 situated on the piston 3 during contact of the first plate skirt 12 on the seal 22, a space 32 between two merlons 31 must be situated opposite an opening 35 of a communication duct 9 between the front chambers. A merlon 31 then does not press against such an outlet 35. A portion of the first lip 23 does not obstruct the communication duct 9.

To this end, several merlons are made on the lip 23 to correspond with several outlets 35. Where necessary, regularity of distribution of the merlons is different from the regularity of distribution of the orifices to always ensure a leakage. In practice, the lengths of the tops 31 of the merlons are greater than the lengths of the spaces 32. The shape of the merlons is straight-edged. It would be possible to give it a sinusoidal profile.

In yet more extreme cases, it may happen that the first plate skirt 12 adheres to the second lip 24 of the seal 22 in a sealed manner. The seal of this adhesion then also blocks the vacuum in the first front chamber 5 and blocks the return of the pneumatic piston 4 to the rest position. In order to also ensure an effective communication leakage between the first front chamber 5 and the communication duct 9 in these cases, it is possible, according to the invention, to have protrusions 27 on the wall 28 of the second lip 24 facing the first plate skirt 12. Such protrusions 27 ensure a communication leakage 30 between the first front chamber 5 and the communication leakages 33 created by the spaces 32 between the merlons 31. These communication leakages 30 and 33 combined prevent the blockage of the vacuum in the first front chamber 5 in such extreme cases.

These protrusions 27 can appear in the form of protuberances 27. These protuberances rise relative to a plane of a crown formed by the lip 24.

To make communication between the communication leakages 30 and 33 easier, one of the spaces 32 between two merlons 31 may be situated opposite a space 29 between two protrusions 27.

Since the communication passing through the space 32 between two merlons 31 can be easier than the communication passing through the space 29 separating two protrusions 27, the number of protrusions 27 may be greater than the number of merlons 31. Therefore the number of protrusions 27 may preferably be twice as great as the number of merlons 31.

Since the number of merlons 31 can be smaller than the number of protrusions 27, a merlon 31 may be situated opposite a space 29 between two protrusions 27.

In the same manner and for the same reasons as for the merlons 31, it is possible to place the protrusions 27 at regular intervals on the wall 28 of the second lip 24.

The spaces 32 separating the merlons 31 have an arc length equal to that of the spaces 29 separating two protrusions 27. Therefore, an arc length 34 formed by a merlon 31 is equal to a length 40 separating the opposite ends of two protrusions 27 side by side.

According to the invention, the merlons 31 come into contact with the first plate skirt 12 before the protrusions 27. This feature helps to prevent a sealed adhesion between the second lip 24 and the first plate skirt 12. The merlons 31 sustain, in such a situation, the pressure from the second plate skirt 12 while preventing the protrusions 27 from sustaining too much pressure. For this purpose, the merlons 31 rise in the direction of the first plate skirt 12 to a higher level than that of the protrusions 27.

Finally, in order to improve the sealing quality of such a seal 22, the seal 22 is made of rubber.

The invention claimed is:

1. Tandem pneumatic brake booster for a vehicle comprising a shell, a pneumatic piston sliding in the shell, two pairs of chambers, each pair comprising a front chamber and a rear chamber, the front chamber being situated closer to a brake master cylinder than the rear chamber, a fixed partition in the booster, separating a first front chamber from a second rear chamber, a first plate skirt, separating the first front chamber from the first rear chamber, and a second plate skirt, separating the second front chamber h from the second rear chamber, these plate skirts being movable, sealed and moving the pneumatic piston, a seal fixed to the fixed partition, the pneumatic piston sliding inside this seal in a sealed manner, this seal comprising a first lip pressed on the pneumatic piston in a sealed manner, and extending parallel to the axis of movement of the pneumatic piston, characterized in that the first lip is crenellated, and characterized in that the seal comprises a second lip extending in the first front chamber perpendicular to the axis of movement of the pneumatic piston, this second lip comprising protrusions on its wall opposite the first plate skirt, a space between two merlons is situated opposite a space between two protrusions.

2. Booster according to claim 1, characterized in that the crenelation comprises merlons separated by spaces, a space between two merlons is situated opposite an outlet of a duct of a body of the pneumatic piston to arrange a communication between the first front chamber and the second front chamber.

3. Booster according to claim 1, characterized in that merlons of the first lip are at regular intervals.

4. Booster according to claim 1, characterized in that the number of protrusions is twice as great as the number of merlons.

5. Booster according to claim 1, characterized in that a merlon is situated opposite a space between two protrusions.

6. Booster according to claim 1, characterized in that protrusions of the second lip are at regular intervals.

7. Booster according to claim 1, characterized in that a length of an arc formed by a merlon is equal to the length separating the opposite ends of two protrusions side by side.

8. Booster according to claim 1, characterized in that the merlons rise to a level higher than the protrusions in the direction of the first plate skirt.

9. Booster according to claim 1, characterized in that the seal is made of rubber.

10. Booster according to claim 2, characterized in that merlons of the first lip are at regular intervals.

11. Booster according to claim 10, characterized in that the number of protrusions is twice as great as the number of merlons.

12. Booster according to claim 11, characterized in that a merlon is situated opposite a space between two protrusions.

13. Booster according to claim 12, characterized in that protrusions of the second lip are at regular intervals.

14. Booster according to claim 13, characterized in that a length of an arc formed by a merlon is equal to the length separating the opposite ends of two protrusions side by side.

15. Booster according to claim 14, characterized in that the merlons rise to a level higher than the protrusions in the direction of the first plate skirt.

* * * * *